Figure 1:
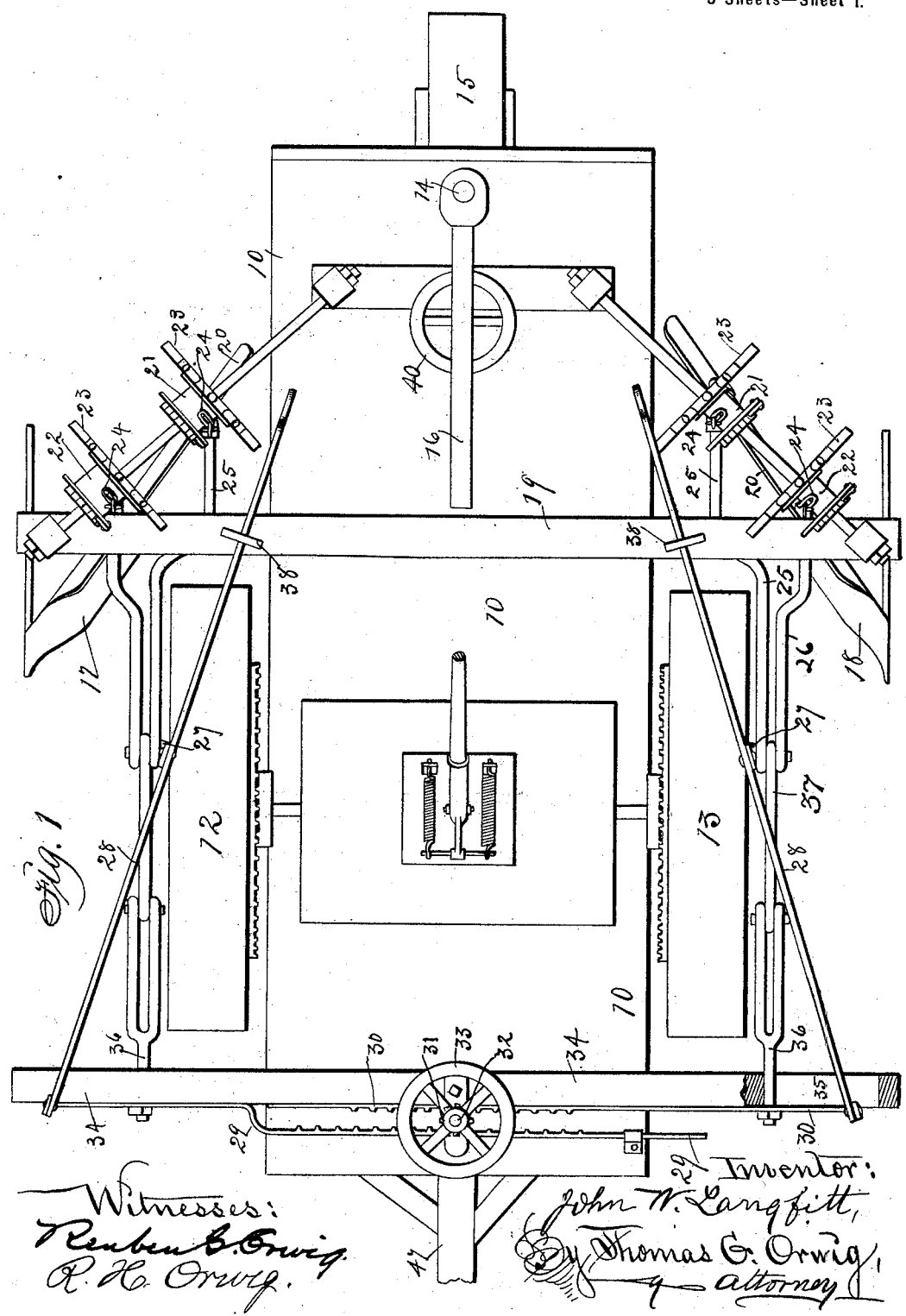

No. 706,671. Patented Aug. 12, 1902.
J. W. LANGFITT.
ELECTRIC ROAD GRADING MACHINE.
(Application filed June 29, 1901.)
(No Model.) 3 Sheets—Sheet 1.

Witnesses: Reuben G. Orwig. R. H. Orwig.

Inventor: John W. Langfitt, By Thomas G. Orwig, Attorney

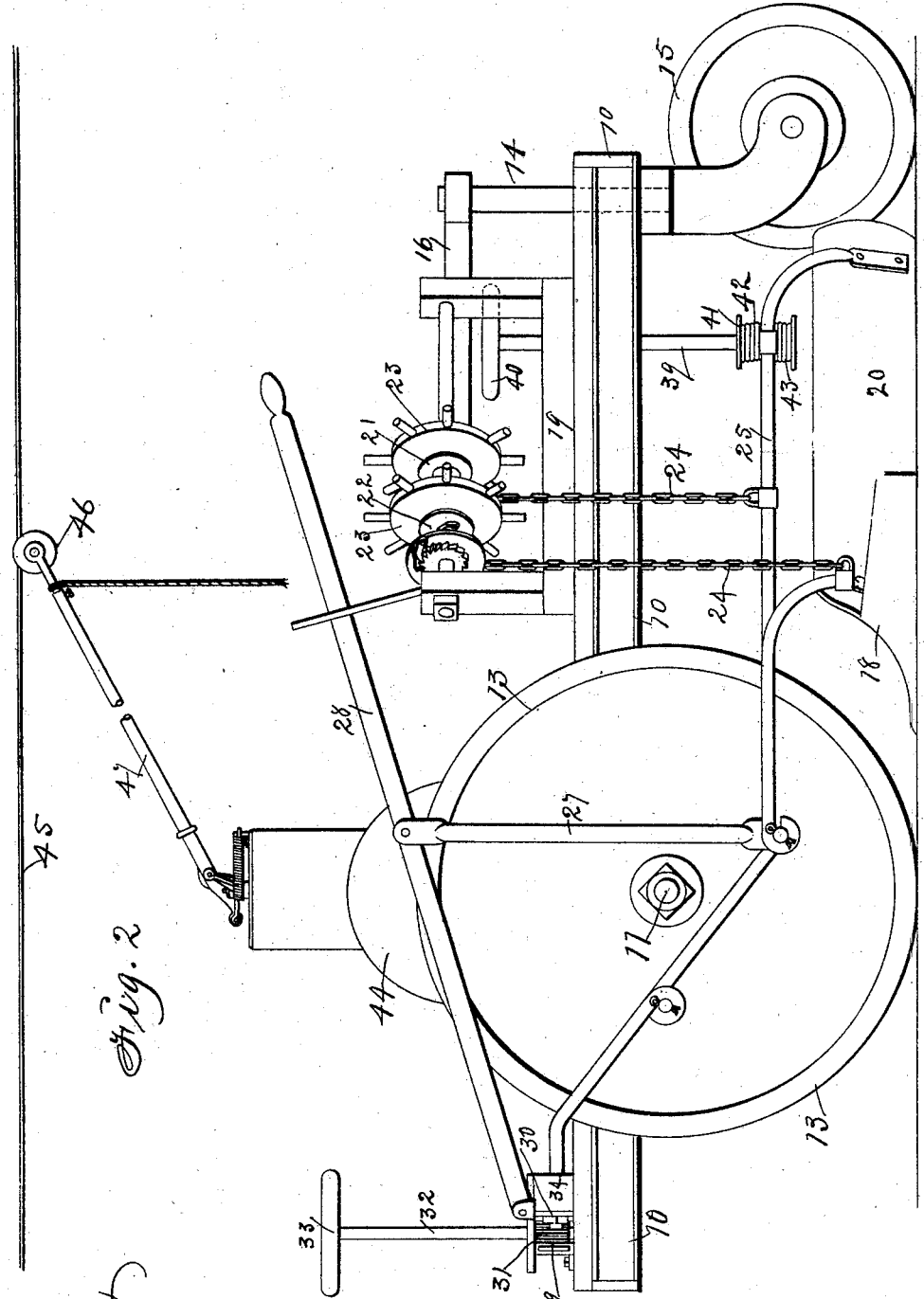

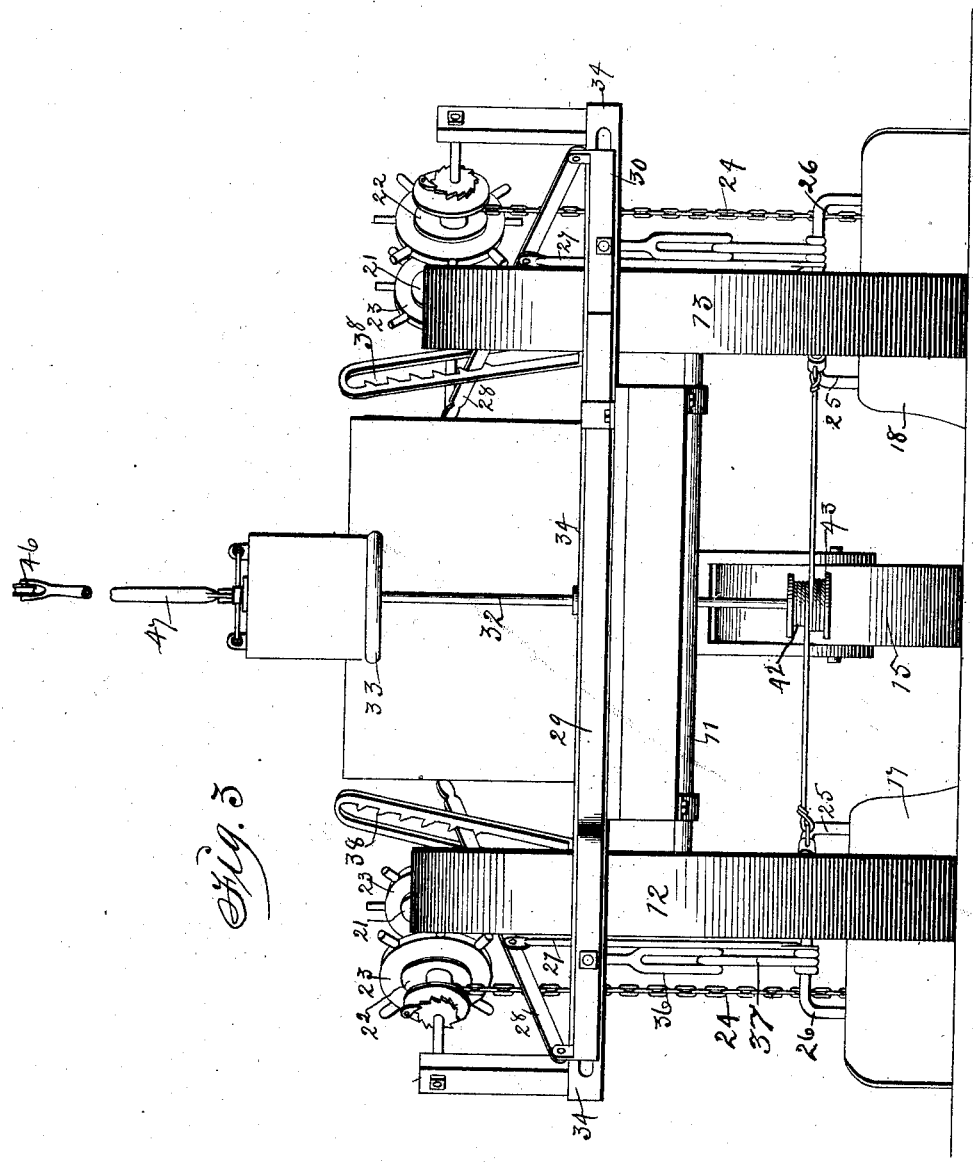

UNITED STATES PATENT OFFICE.

JOHN W. LANGFITT, OF ADEL, IOWA.

ELECTRIC ROAD-GRADING MACHINE.

SPECIFICATION forming part of Letters Patent No. 706,671, dated August 12, 1902.

Application filed June 29, 1901. Serial No. 66,606. (No model.)

*To all whom it may concern:*

Be it known that I, JOHN W. LANGFITT, a citizen of the United States, residing at Adel, in the county of Dallas and State of Iowa, have invented a new and useful Apparatus for Grading Roads by Means of Electricity, of which the following is a specification.

My object is to facilitate the construction and lessen the cost of electric railroads operated by means of elevated conductors.

My invention consists in an apparatus adapted to be connected with an elevated conductor by means of a trolley, and is constructed as hereinafter set forth, pointed out in my claims, and illustrated in the accompanying drawings, in which—

Figure 1 is a top view showing the relative positions of all the parts. Fig. 2 is a side elevation of the machine, showing it in position relative to an overhead electric conductor as required for practical use. Fig. 3 is a front elevation of the machine, adapted to be electrically connected with an overhead conductor by means of a trolley.

The numeral 10 designates a carriage-frame adapted to be mounted upon wheels. It is preferably quadrilateral in shape and made of metal bars bolted or otherwise joined together and covered with boards to produce a platform on the frame. An axle 11 is fixed to the frame and traction-wheels 12 and 13, rotatably mounted on the ends of the axle. A wheel-bearer 14 is pivotally connected with the center of the rear end of the frame, and 15 is a wheel mounted in the forks of the bearer to serve as a means for rotating the bearer and steering the machine when the machine is moved forward or backward. Plows 17 and 18 are adjustably connected with an auxiliary frame 19, that is fixed on top of the carriage-frame 10 to extend outward at each side of the carriage-frame to support the plows in such a manner that they can be operated outside of the tracks of the traction-wheels 12 and 13 as the machine is advanced to plow up ground and scrape and move the loose ground toward the center of the line of advance. The moldboards 20 of the plows are extended in inclined positions relative to the line of advance and adapted to serve as scrapers.

Drums 21 and 22 are mounted on each end portion of the auxiliary frame 19, and a handwheel 23 connected with each drum in such a manner that chain 24, fixed to the drums and connected at their lower ends with the plows, can be wound on the drums as required for governing the depth of furrows cut by the plows, and also as required for raising and lowering the plows and carrying them inoperative whenever desired.

The drums 22 nearest the center of the machine are connected with the inner and longest parts 25 of the plow-beams by means of a chain 24 in such a manner that the shortening of the chain by winding it on the drum 21 will raise the rear portion of the plow as required to lower the point of the plow to sink deeper into the ground.

To elevate the plows as required to retain them inoperative, both chains connected therewith are wound upon the drums and retained thereon by means of ratchets and pawls connected with the drums, as shown in Fig. 2, or in any suitable way.

The inner plow-beams 25, connected with the moldboard or scrapers extending inward from the plows 17 and 18, and also the outer plow-beams 26, are jointly and pivotally connected at their front ends with hangers 27, suspended from levers 28, as shown in Fig. 2, or in any suitable way, in such a manner that the plows can be governed in some degree by said levers, and also raised and retained elevated and inoperative intermittently as the machine is advanced and as required to pass the plows over stones or other obstacles that may be in the way. The levers 28 are fulcrumed to slidable rack-bars 29 and 30, mounted on the front of the machine, to be moved in opposite direction by means of a pinion 31 in engagement therewith and fixed to the lower end of a shaft 32, that has a hand-wheel 33 fixed to its top end, as shown in Fig. 2, in such a manner that the rackbars can be simultaneously moved in reverse ways as required to move the levers 28 and the plows 17 and 18 in and out relative to the center of the line of advance.

The rack-bars 29 and 30 are slidably connected with a bar 34, fixed to the front and top of the carriage-frame, that has elongated slots 35, through which are extended links 36, that are fixed to the ends of the rack-bars.

The rear ends of said links are pivotally connected with the plow-beams 24 and 25 by means of links 37 in such a manner that the plows can be raised and lowered and also moved laterally by means of the rack-bars 29 and 30 and the levers 28.

Racks 38 or other suitable devices are fixed to the auxiliary frame 19 for retaining the levers 28 stationary at different points of elevation as required for retaining the plows at different points of elevation at different times.

A shaft 39 in bearings fixed to the carriage has a hand-wheel 40 at its top and a drum 41 at its bottom for winding ropes 42 and 43 thereon. The ends of the ropes are fixed to the drum and to the plow-beams 25 in such a manner that the plows can be pulled toward the center of the line of advance by winding the ropes upon the drum.

An electric motor 44 is mounted on the carriage and connected with the traction-wheels 12 and 13, having fixed gear-wheels $a$, by a driving-shaft $b$, and fixed gear-wheels $c$, as shown in Fig. 1, or in any suitable way, as required to transmit power and motion to the traction-wheels for propelling the machine when the motor is connected with an overhead conductor 45 by means of an adjustable trolley 46 (shown in Fig. 2) or in any suitable way, so that the motor may be electrically connected and disconnected with an electric conductor at the pleasure of a person on the machine.

A pole 47 or other suitable device for hitching horses to the machine for moving it about may be fixed to the front, as shown in Fig. 1, or in any suitable way.

Having thus described the purpose of my invention and the construction, function, arrangement, and combination of all the parts, the practical operation and utility of the machine will be readily understood by persons familiar with the art to which it pertains, and

What I claim as new, and desire to secure by Letters Patent, is—

1. In a machine for grading roads, a carriage-frame mounted upon an axle having traction-wheels on its ends and a steering-wheel at the end and center of the frame and plows adjustably connected with the carriage to advance at the sides of the carriage, means for moving the plows laterally at the front ends of the beams, means for moving the plows laterally at the rear ends of the beams, and means for raising and lowering the plows, arranged and combined to operate in the manner set forth for the purposes stated.

2. In a machine for grading roads, a carriage-frame mounted upon an axle having traction-wheels on its ends and a steering-wheel at one end and center of the frame and plows adjustably connected with the carriage to advance at the sides of the carriage, means for raising and lowering the plows and means for adjusting the plows laterally relative to the carriage and the line of advance, arranged and combined to operate in the manner set forth for the purposes stated.

3. In a machine for grading roads, plows having scrapers extended laterally and rearward adjustably suspended at the sides of the carriage, slidable racks mounted on the front of the carriage and connected with the plow-beams and means for moving said racks simultaneously in reverse ways, arranged and combined to operate in the manner set forth for the purposes stated.

4. In a machine for grading roads, plows having scrapers extended laterally and rearward adjustably suspended at the sides of the carriage, slidable racks mounted on the front of the carriage and connected with plow-beams and means for moving said racks simultaneously in reverse ways, levers connected with the ends of the slidable racks and hangers pivotally connected with the central parts of said levers and also pivotally connected with the front ends of the plow-beams, arranged and combined to operate in the manner set forth for the purposes stated.

5. In a machine for grading roads, plows having scrapers extended laterally and rearward adjustably suspended at the sides of the carriage, slidable racks mounted on the front of the carriage and connected with plow-beams and means for moving said racks simultaneously in reverse ways, levers connected with the ends of the slidable racks and hangers pivotally connected with the central parts of said levers and also pivotally connected with the front ends of the plow-beams and means for retaining said levers at different points of elevation, arranged and combined to operate in the manner set forth for the purposes stated.

6. In a machine for grading roads, plows having scrapers extended laterally and rearward adjustably suspended at the sides of the carriage, slidable racks mounted on the front of the carriage and connected with the plow-beams and means for moving said racks simultaneously in reverse ways, levers connected with the ends of the slidable racks and hangers pivotally connected with the central parts of said levers and also pivotally connected with the front ends of the plow-beams, means for retaining said levers at different points of elevation and means connected with the carriage and the rear ends of the plow-beams for adjusting the plows laterally relative to each other and the carriage, arranged and combined to operate in the manner set forth for the purposes stated.

7. In a machine for grading roads, a carriage, a plow adjustably connected at each side of the carriage with the front of the carriage, a drum at the center and rear part of the carriage, ropes fixed to the drum and to the rear ends of the plow-beams, drums mounted on the rear part of the carriage, chains fixed to the drums and also fixed to the plows, and means for operating the drums for raising and lowering the plows, arranged and combined to operate in the manner set forth for the purposes stated.

8. A road-grading machine comprising a carriage-frame, an axle fixed to the front portion of the carriage, wheels mounted on the ends of said axle, a wheel-bearer pivotally connected with the rear and center, a wheel mounted in the bearer, means for adjusting said wheel-bearer and wheel, a motor on the front portion of the carriage connected with the front carriage-wheels by means of a driving-shaft having gear-wheels fixed to its ends and gear-wheels fixed to the carriage-wheels, plows suspended under the rear end portion of the carriage, means for raising and lowering the plows and means for adjusting the plows relative to the line of advance, arranged and combined to operate in the manner set forth for the purposes stated.

JOHN W. LANGFITT.

Witnesses:
G. L. DE CAMP,
GEO. W. CURTIS, Jr.